(12) United States Patent
Choi et al.

(10) Patent No.: US 9,235,085 B2
(45) Date of Patent: Jan. 12, 2016

(54) LIQUID CRYSTAL DISPLAY DEVICE

(71) Applicant: LG Display Co., Ltd., Seoul (KR)

(72) Inventors: Won-Jun Choi, Gyeongsangbuk-do (KR); Se-Joon Baek, Gyeonggi-do (KR); Sung-Lim Nam, Gyeonggi-do (KR); Bum-Sik Seo, Gyeonggi-do (KR); Hyuck Oh, Seoul (KR); Hyo-Il Jeon, Daejeon-si (KR)

(73) Assignee: LG Display Co., Ltd., Seoul (KR)

( * ) Notice: Subject to any disclaimer, the term of this patent is extended or adjusted under 35 U.S.C. 154(b) by 188 days.

(21) Appl. No.: 13/723,549

(22) Filed: Dec. 21, 2012

(65) Prior Publication Data

US 2014/0016070 A1 Jan. 16, 2014

(30) Foreign Application Priority Data

Jul. 16, 2012 (KR) .................. 10-2012-0077145

(51) Int. Cl.
*G02F 1/1339* (2006.01)
*G02F 1/1333* (2006.01)

(52) U.S. Cl.
CPC .. *G02F 1/1339* (2013.01); *G02F 2001/133354* (2013.01); *G02F 2202/28* (2013.01)

(58) Field of Classification Search
CPC ................. G02F 1/1339; G02F 2001/133354; G02F 2202/28
USPC .......................................... 349/153
See application file for complete search history.

(56) References Cited

U.S. PATENT DOCUMENTS

| 7,417,703 | B2 * | 8/2008 | Kim ................. 349/153 |
| 8,334,963 | B2 * | 12/2012 | Yoshida et al. ............. 349/153 |
| 8,379,179 | B2 * | 2/2013 | Kim et al. ................ 349/153 |
| 2005/0073638 | A1 * | 4/2005 | Byun et al. ................ 349/156 |
| 2006/0170854 | A1 * | 8/2006 | Han et al. .................. 349/153 |
| 2008/0117344 | A1 * | 5/2008 | Kim et al. .................. 349/39 |
| 2013/0250227 | A1 | 9/2013 | Kira et al. |

FOREIGN PATENT DOCUMENTS

| JP | 2008-158169 A | 7/2008 |
| WO | 2012/074010 A1 | 6/2012 |

OTHER PUBLICATIONS

Extended European Search Report dated Oct. 11, 2013 for Application No. 12197342.4.

* cited by examiner

*Primary Examiner* — Richard Kim
*Assistant Examiner* — Kendrick Hsu
(74) *Attorney, Agent, or Firm* — Morgan, Lewis & Bockius LLP

(57) ABSTRACT

A liquid crystal display (LCD) device includes first and second substrates facing each other, each of the first and second substrates having a first substrate having a display region, a non-display region, and a seal pattern region disposed in the non-display region; a protection layer on the first substrate and having a first seal pattern groove in the seal pattern region; first and second dams on the second substrate and respectively disposed at both ends of the first seal pattern groove, the first and second dams configured to form a second seal pattern groove corresponding to the first seal pattern groove; a pixel electrode on the first substrate; a common electrode on one of the first and second substrates; a liquid crystal layer between the first and second substrates; and a seal pattern having one end inserted into the first seal pattern groove and the other end inserted into the second seal pattern groove.

14 Claims, 13 Drawing Sheets

LIQUID CRYSTAL DISPLAY DEVICE

The present application claims the priority benefit of Korean Patent Application No. 10-2012-0077145 filed in the Republic of Korea on Jul. 16, 2012, which is hereby incorporated by reference.

BACKGROUND

1. Field of the Disclosure

The present disclosure relates to a liquid crystal display (LCD) device, and more particularly, to an LCD device in which a guide pattern for a seal pattern is formed to reduce a design margin during formation of the seal pattern so that a narrow bezel can be embodied.

2. Discussion of the Related Art

In recent years, with the advent of information-oriented society, display devices configured to process and display a large amount of information have been developed at a high speed. Among the display devices, LCD devices have lately been developed as highly efficient flat panel display (FPD) devices, which may be made ultrathin and lightweight and consume low power to supersede conventional cathode ray tubes (CRTs).

Among the LCD devices, an active-matrix-type LCD including an array substrate in which a thin film transistor (TFT) serving as a switching device capable of controlling on/off states of a voltage in each of pixels is provided has attracted much attention because the active-matrix-type LCD has a high resolution and is highly capable of embodying moving images.

FIG. 1 is a schematic plan view of a conventional liquid crystal display (LCD) device, and FIG. 2 is a schematic cross-sectional view of portion A of FIG. 1.

As shown in FIG. 1, the LCD device may include a first substrate 10 on which a thin film transistor (TFT) Tr serving as a switching device and a pixel electrode 50 are formed, a second substrate 60 on which a common electrode 66 is formed, an LC layer 70 interposed between the first and second substrates 10 and 60, and a seal pattern 80 configured to bond the first and second substrates 10 and 60 to each other to prevent leakage of LCs from the LC layer 70. The first and second substrates 10 and 60 may be disposed opposite each other.

A display region DR and a non-display region NDR may be defined on the first substrate 10. The display region DR may be configured to display images, and the non-display region NDR may be disposed adjacent to the display region DR. The seal pattern 80 may be disposed in the non-display region NDR.

Gate lines (not shown) and data lines (not shown) may be formed on the first substrate 10 to enable switching operations of the TFT Tr. A driver configured to apply signals to the gate lines and the data lines may be formed on at least one side of the first substrate 10. In this case, to connect the driver with an external driver circuit, the second substrate 60 may have a smaller size than the first substrate 10 and expose at least one side of the first substrate 10.

The TFT Tr may include a gate electrode 14 connected to the gate line, a gate insulating layer 20 covering the gate electrode 14, a semiconductor layer 22 disposed on the gate insulating layer 20 and including an active layer 22a formed of pure amorphous silicon (a-Si) and an ohmic contact layer 22b formed of doped a-Si, a source electrode 32 disposed on the semiconductor layer 22 and connected to the data line, and a drain electrode 34 disposed on the semiconductor layer 22 and spaced apart from the source electrode 32.

A protection layer 40 having a drain contact hole 42 exposing the drain electrode 34 may be formed to cover the TFT Tr. A pixel electrode 50 may be formed on the protection layer 40 and connected to the drain electrode 34 through the drain contact hole 42. The pixel electrode 50 may be disposed in each of pixel regions P defined by intersections between the gate lines and the data lines.

In addition, a black matrix 62, a color filter layer 64, and a common electrode 66 may be formed on the second substrate 60 disposed opposite the first substrate 10. The black matrix 62 may cover the gate line and the data line, the color filter layer 64 may correspond to the pixel region P, and the common electrode 66 may be configured to form an electric field along with the pixel electrode 50.

The LC layer 70 may be disposed between the first and second substrates 10 and 60, that is, between the pixel electrode 50 and the common electrode 66, and LC molecules of the LC layer 70 may be driven due to an electric field formed between the pixel electrode 50 and the common electrode 66.

As described above, the seal pattern 80 may be formed in the non-display region NDR to prevent leakage of LCs from the LC layer 70 and bond the first and second substrates 10 and 60 to each other. One end of the seal pattern 80 may be in contact with the protection layer 40, and the other end thereof may be in contact with the second substrate 60.

The seal pattern 80 may be formed by coating a sealant on the first substrate 10 or the second substrate 60 using a dispenser.

However, the seal pattern 80 may depart from a desired position during the formation thereof.

A deviation in the position of the seal pattern 80 will be described in further detail with reference to FIGS. 3A and 3B.

Initially, as shown in FIG. 3A, when the sealant is coated with a dispenser (not shown) located in a first position PO1, the seal pattern 80 may be formed in a desired position. However, as shown in FIGS. 3B and 3C, when the sealant is coated with the dispenser deviated from the first position PO1 and located in a second position PO2 or third position PO3, a deviation DV caused by the spread of the sealant may occur during a bonding process, so the sealant 80 may depart from a desired position.

A region in which the sealant 80 is to be formed should increase by as much as the deviation DV in consideration of the deviation DV, so that the non-display region NDR may increase. That is, embodying a narrow bezel required by an LCD may be hindered.

SUMMARY OF THE INVENTION

Accordingly, the present invention is directed to a liquid crystal display (LCD) device that substantially obviates one or more of the problems due to limitations and disadvantages of the related art.

An object of the present disclosure is to provide a narrow-bezel-type liquid crystal display (LCD) device in which a structure configured to determine a position in which a seal pattern will be formed is formed to prevent occurrence of a deviation in the position of a seal pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an LCD device includes: first and second substrates facing each other, each of the first and second substrates having a first substrate having a display region, a non-display region, and a seal pattern region disposed in the non-display region; a protection layer on the first substrate and having a first seal pattern groove in the seal pattern region; first and second dams on the second substrate and respectively disposed at both ends of the first seal pattern groove, the first and second dams configured to form a second seal pattern groove corresponding to the first seal pattern groove; a pixel electrode on the first substrate; a common electrode on one of the first and second substrates; a liquid crystal layer between the first and second substrates; and a seal pattern having one end inserted into the first seal pattern groove and the other end inserted into the second seal pattern groove.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the exemplary embodiments, examples of which are illustrated in the accompanying drawings.

Figure 4:
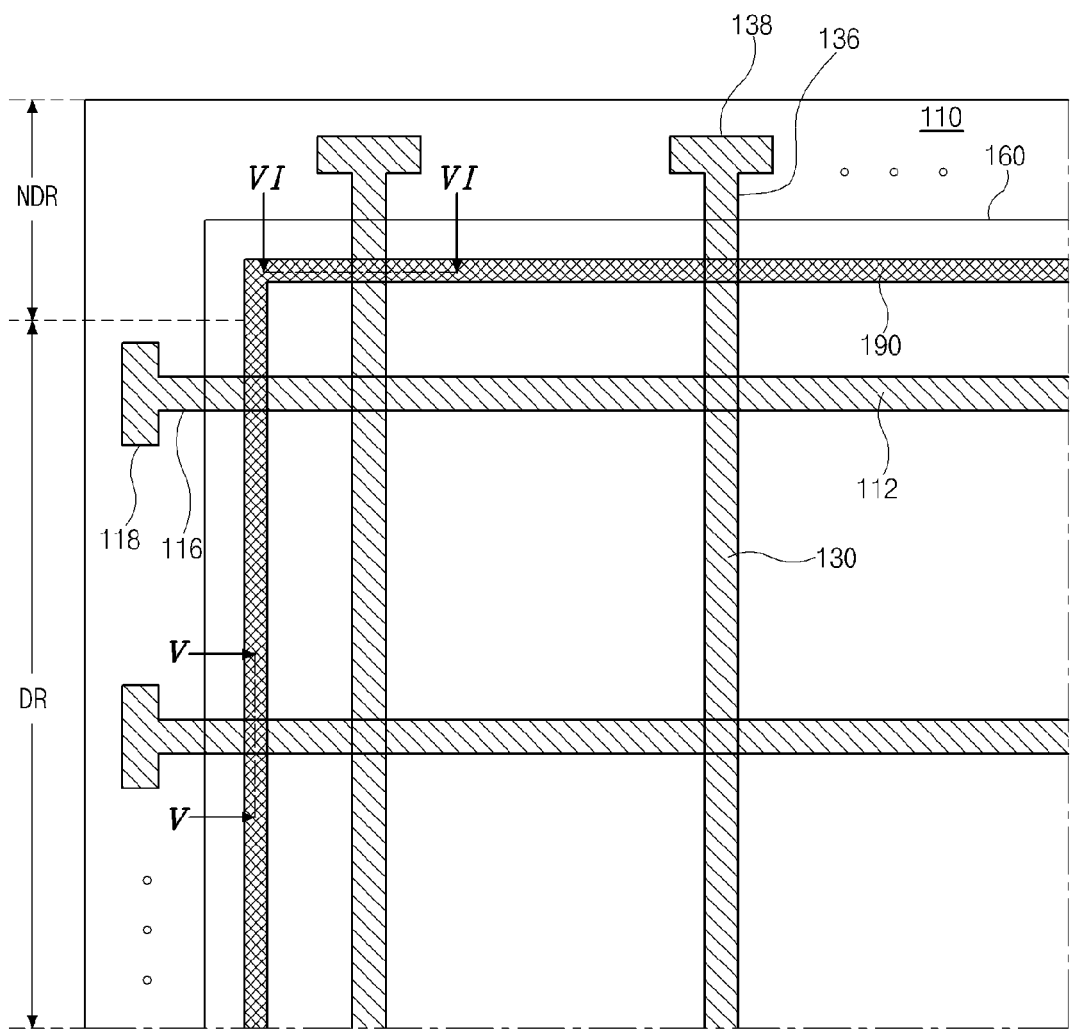
FIG. 4 is a schematic plan view of an LCD device according to a first embodiment of the present invention.
Figure 5:
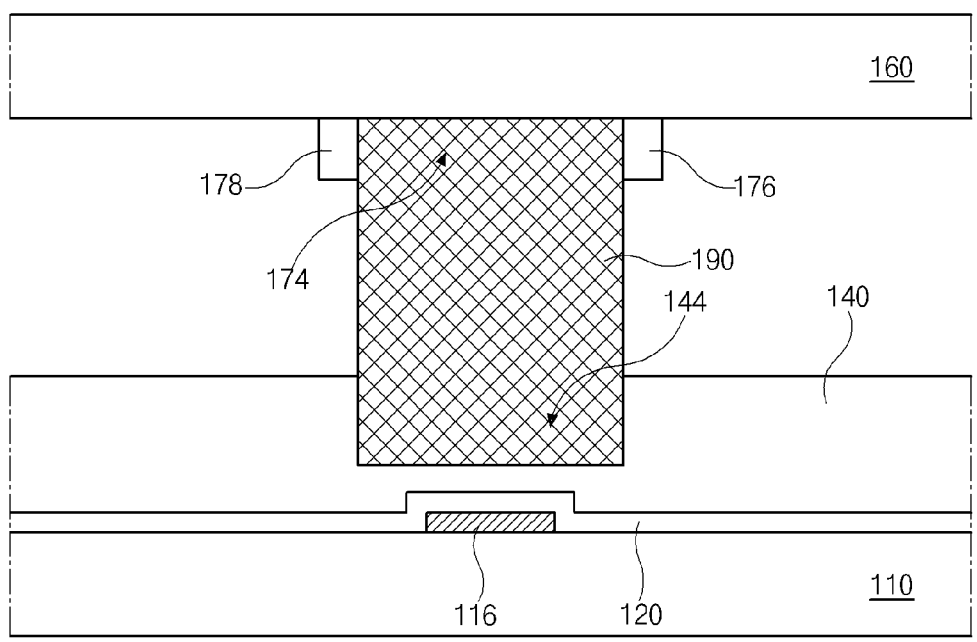
FIG. 5 is a cross-sectional view of a portion taken along line V-V of FIG. 4.
Figure 6:
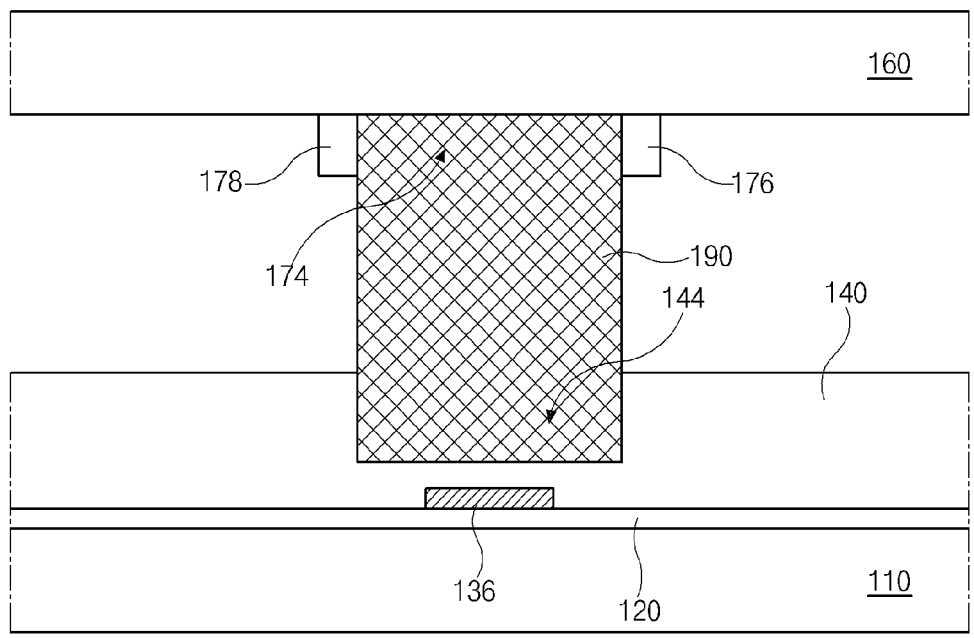
FIG. 6 is a cross-sectional view of a portion taken along line VI-VI of FIG. 4.
Figure 7:
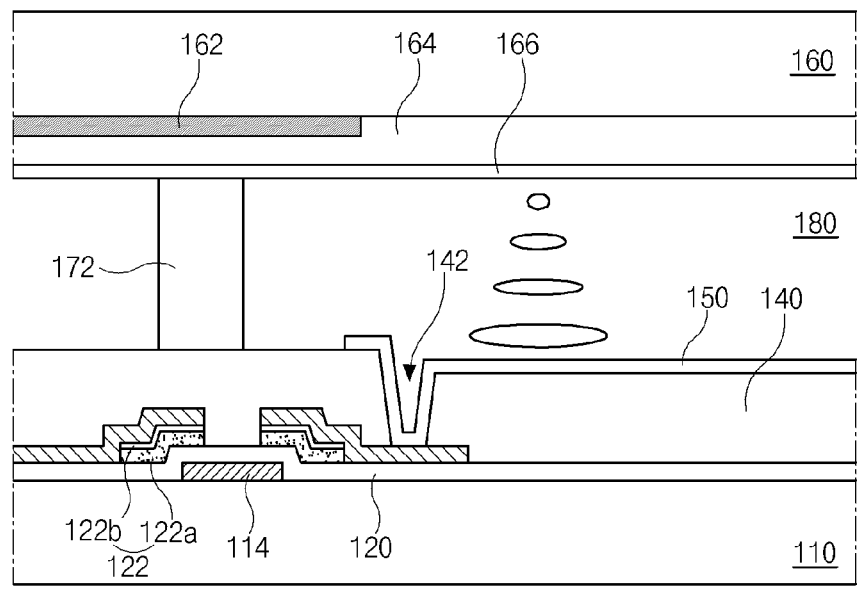
FIG. 7 is a schematic cross-sectional view of a pixel region of the LCD device according to the first embodiment of the present invention.

FIG. 4 is a schematic plan view of a liquid crystal display (LCD) device according to a first embodiment of the present invention, FIG. 5 is a cross-sectional view of a portion taken along line V-V of FIG. 4, FIG. 6 is a cross-sectional view of a portion taken along line VI-VI of FIG. 4, and FIG. 7 is a schematic cross-sectional view of a pixel region of the LCD device according to the first embodiment of the present invention.

As shown in FIGS. 4 through 7, the LCD device according to the first embodiment of the present invention may include a first substrate 110, a second substrate 160, an LC layer 180, and a seal pattern 190. A thin film transistor (TFT) Tr serving as a switching device and a pixel electrode 150 may be formed on the first substrate 110. The second substrate 160 on which a common electrode 166 may be formed may be disposed opposite the first substrate 110. The LC layer 180 may be interposed between the first and second substrates 110 and 160. The seal pattern 190 may bond the first and second substrates 110 and 160 to each other to prevent leakage of LCs from the LC layer 180.

A display region DR and a non-display region NDR may be defined on the first substrate 110. The display region DR may be configured to display images, and the non-display region NDR may be disposed adjacent to the display region DR. The seal pattern 190 may be formed in a seal pattern region (not shown) disposed in the non-display region NDR.

Gate lines 112 and data lines 130 may be formed on the first substrate 110 to enable switching operations of the TFT Tr. A driver configured to apply signals to the gate lines 112 and the data lines 130 may be formed on at least one side of the first substrate 110. In this case, to connect the driver with an external driver circuit, the second substrate 160 may have a smaller size than the first substrate 110 and expose at least one side of the first substrate 110.

The gate lines 112 and the data lines 130 may intersect to define a plurality of pixel regions P on the display region DR. The TFT Tr serving as a switching device and the pixel electrode 150 may be formed in each of the pixel regions P.

The TFT Tr may include a gate electrode 114 connected to the gate line 112, a gate insulating layer 120 covering the gate electrode 114, a semiconductor layer 122 including an active layer 122a disposed on the gate insulating layer 120 and formed of pure a-Si and an ohmic contact layer 122b formed of doped a-Si, a source electrode 132 disposed on the semiconductor layer 122 and connected to the data line 130, and a drain electrode 134 disposed on the semiconductor layer 122 and spaced apart from the source electrode 132.

A protection layer 140 having a drain contact hole 142 exposing the drain electrode 134 may be formed to cover the TFT Tr. The pixel electrode 150 may be formed on the protection layer 140 and connected to the drain electrode 134 through the drain contact hole 142.

A gate link line 116 and a gate pad 118 may be formed in the non-display region NDR disposed on one side of the first substrate 110. The gate link line 116 may extend from the gate line 112, and the gate pad 118 may be connected to an end of the gate link line 116. Although not shown, a gate pad electrode may be formed of the same material in the same layer as the pixel electrode 150 and connected to the gate pad 118.

The gate insulating layer 120 and the protection layer 140 may be stacked to cover the gate link line 118.

A data link line 136 and a data pad 138 may be formed in the non-display region NDR disposed on the other side of the first substrate 110. The data link line 136 may extend from the data line 130, and the data pad 138 may be connected to an end of the data link line 136. Although not shown, a data pad electrode may be formed of the same material in the same layer as the pixel electrode 150 and connected to the data pad 138.

The gate insulating layer 120 may be disposed under the data link line 136, and the protection layer 140 may cover the data link line 136.

In this case, a portion of the protection layer 140 corresponding to the gate link line 116 and the data link line 136 may be etched so that a first seal pattern groove 144 may be formed in the seal pattern region (not shown). That is, when the protection layer 140 has a first thickness, the protection layer 140 may have a second thickness smaller than the first thickness due to the first seal pattern groove 144. In other words, the protection layer 140 may have a first height from the first substrate 110 in the seal pattern region and have a second height greater than the first height from the first substrate 110 in the remaining region.

In this case, the etching of the protection layer 140 may include a process of completely removing the protection layer 140 to form the drain contact hole 142 and a process of removing only a portion of the protection layer 140 to form the first seal pattern groove 144.

Meanwhile, the protection layer 140 may be etched using a halftone mask to improve process efficiency. That is, a mask process may be performed using a mask having a transmission unit, a light blocking unit, and a semi-transmission unit so that a portion of the protection layer 140 corresponding to the transmission unit can be completely removed and a portion of the protection layer 140 corresponding to the semi-transmission unit can be partially etched.

By completely removing the protection layer 140, the gate insulating layer 120 and the data link line 136 may be exposed through the first seal pattern groove 144. However, only a portion of the protection layer 140 may be exposed to prevent the data link line 136 from being exposed and damaged during the etching of the protection layer 140.

Although FIGS. 5 through 7 illustrate the protection layer 140 having a single structure, the protection layer 140 may have a double structure including upper and lower layers, and only the upper layer of the protection layer 140 may be etched. For example, a lower layer formed of an inorganic insulating material, such as silicon oxide or silicon nitride, and an upper layer formed of an organic insulating material, such as photoacryl or benzocyclobutene (BCB), may be stacked to form the protection layer 140, and only the upper layer may be etched, leaving the lower layer and thereby forming the first seal pattern groove 144.

In addition, a black matrix 162, a color filter layer 164, and a common electrode 166 may be formed on the second substrate 160 disposed opposite the first substrate 110. The black matrix 162 may be configured to cover the TFT Tr, the gate line 112, and the data line 130. The color filter layer 164 may correspond to the pixel region P, and the common electrode 16 may be configured to form an electric field along with the pixel electrode 150. The black matrix 162 and the color filter layer 164 may be omitted or formed on the first substrate 110.

Meanwhile, the common electrode 166 may be formed on the first substrate 110 along with the pixel electrode 150 to form an in-plane switching-mode or fringe-field-switching (FFS)-mode structure.

A spacer 172 configured to maintain a cell gap may be formed in the display region DR, and first and second dams 176 and 178 may be formed in the non-display region NDR to correspond to both ends of the first seal pattern groove 144, thereby forming a second seal pattern groove 174 corresponding to the first seal pattern groove 144.

In this case, the first and second dams 176 and 178 may be formed of the same material in the same layer as the spacer 172. The formation of the first and second dams 176 and 178 may be performed using a semi-transmission mask process so that the spacer 172 can have a different height from the first and second dams 176 and 178. Meanwhile, the first and second dams 176 and 178 may be formed of the same material in the same layer as the color filter layer 164. When the color filter layer 164 includes red (R), green (G), and blue (B) color filter patterns, the first and second dams 176 and 178 may include a single layer formed of any one of materials forming the R, G, and B color filter patterns, or include a double or triple layer formed by stacking at least two of materials forming the R, G, and B color filter patterns.

Furthermore, the first and second dams 176 and 178 may be continuously formed along the seal pattern 190 or a plurality of first and second dams 176 and 178 may be formed apart from one another.

The LC layer 180 may be interposed between the first and second substrates 110 and 160, that is, between the pixel electrode 150 and the common electrode 166, and LC molecules of the LC layer 180 may be driven due to an electric field formed between the pixel electrode 150 and the common electrode 166.

Figure 1:
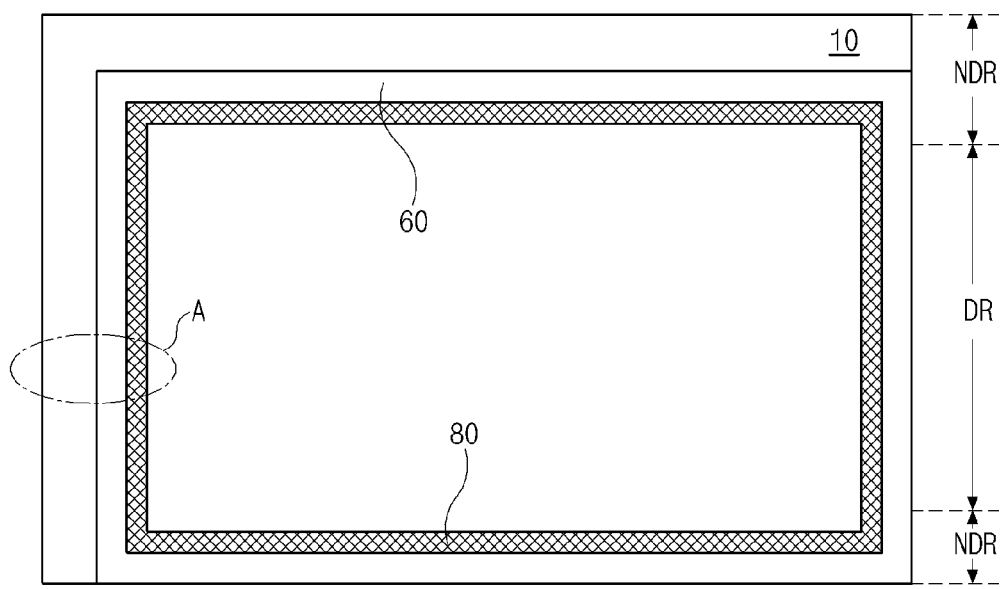
FIG. 1 is a schematic plan view of a conventional liquid crystal display (LCD) device.
Figure 2:
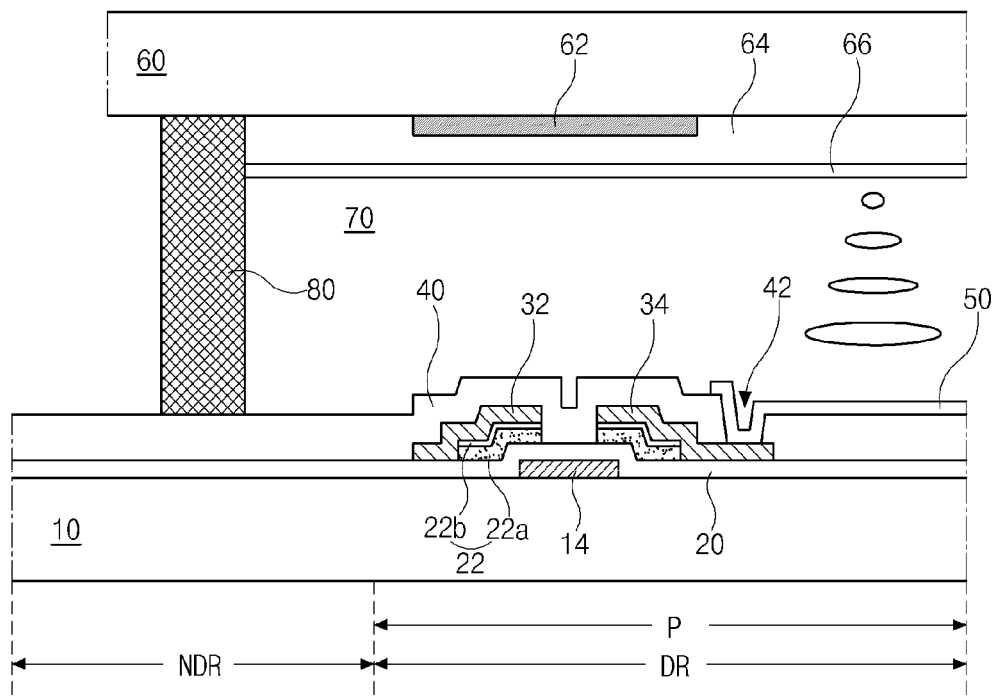
FIG. 2 is a schematic cross-sectional view of portion A of FIG. 1.
Figure 3A:
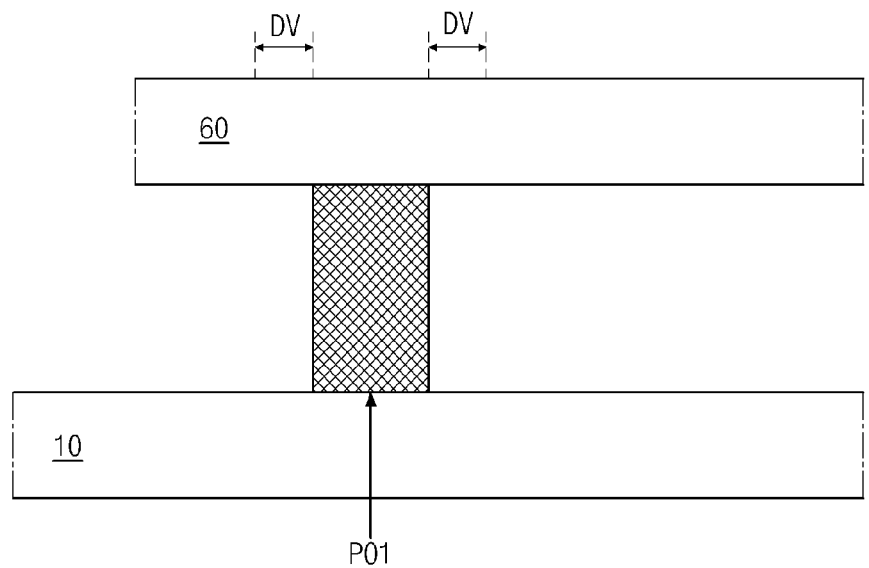
FIGS. 3A to 3C are schematic cross-sectional views for explaining occurrence of a deviation in the position of a seal pattern.
Figure 3B:
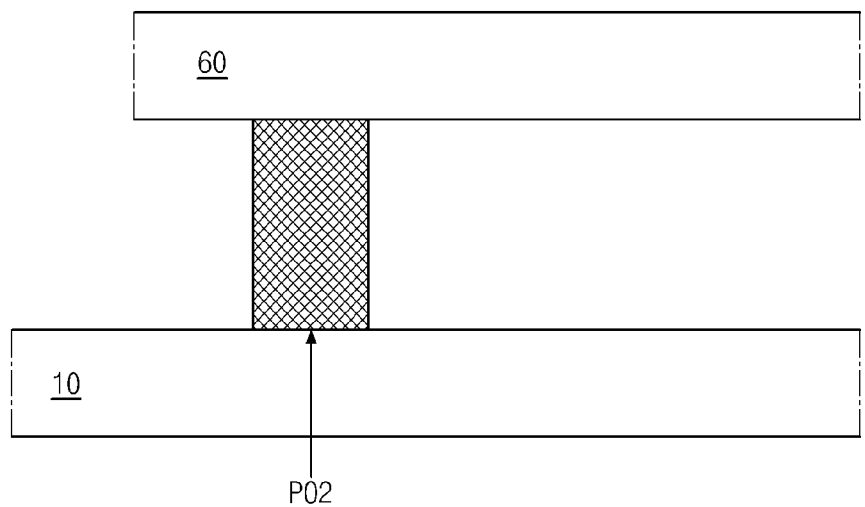
Figure 3C:
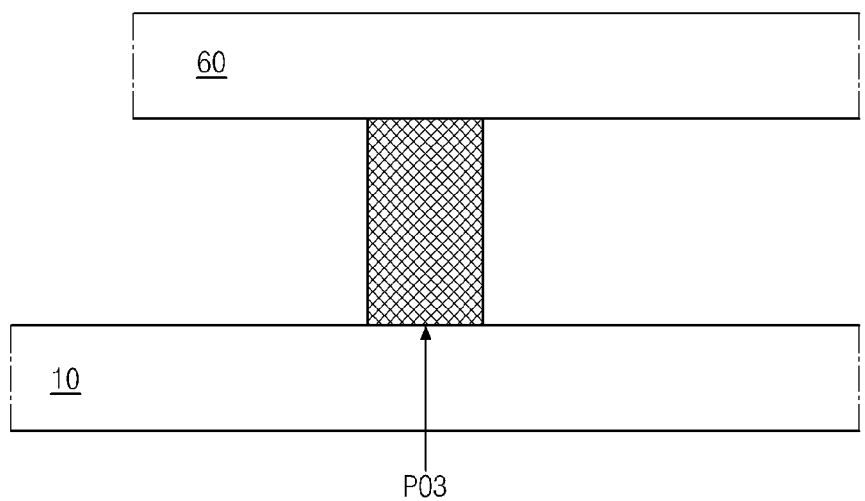

The seal pattern 190 may be formed in the non-display region NDR to prevent leakage of LCs from the LC layer 180 and bond the first and second substrates 110 and 160 to each other. One end of the seal pattern 190 may be inserted into the first seal pattern groove 144 formed in the protection layer 140, while the other thereof may be inserted into the second seal pattern groove 174 interposed between the first and second dams 176 and 178. Due to the above-described construction, even if a sealant is coated with the dispenser located in an undesired second position (refer to PO2 in FIG. 3B) or third position (refer to PO3 in FIG. 3C), the seal pattern 190 may be formed in a position corresponding to the first and second sealant grooves 144 and 174 during a bonding process.

Accordingly, occurrence of a deviation in the position of the seal pattern 190 due to the position of the dispenser or the bonding process may be prevented. Also, since there is no need to consider process errors, the area of the non-display region NDR may be decreased. That is, a narrow-bezel-type LCD device may be provided.

Meanwhile, the width of a seal pattern should be reduced to embody a narrow bezel. Although the width of the seal pattern may be reduced by reducing the amount of the sealant coated using the dispenser, there may be a technical limit to reducing the width of the seal pattern while maintaining a cell gap.

A second embodiment of the present invention proposes a structure in which the width of a seal pattern is further reduced and the seal pattern has a uniform thickness throughout an LCD device.

Figure 8:
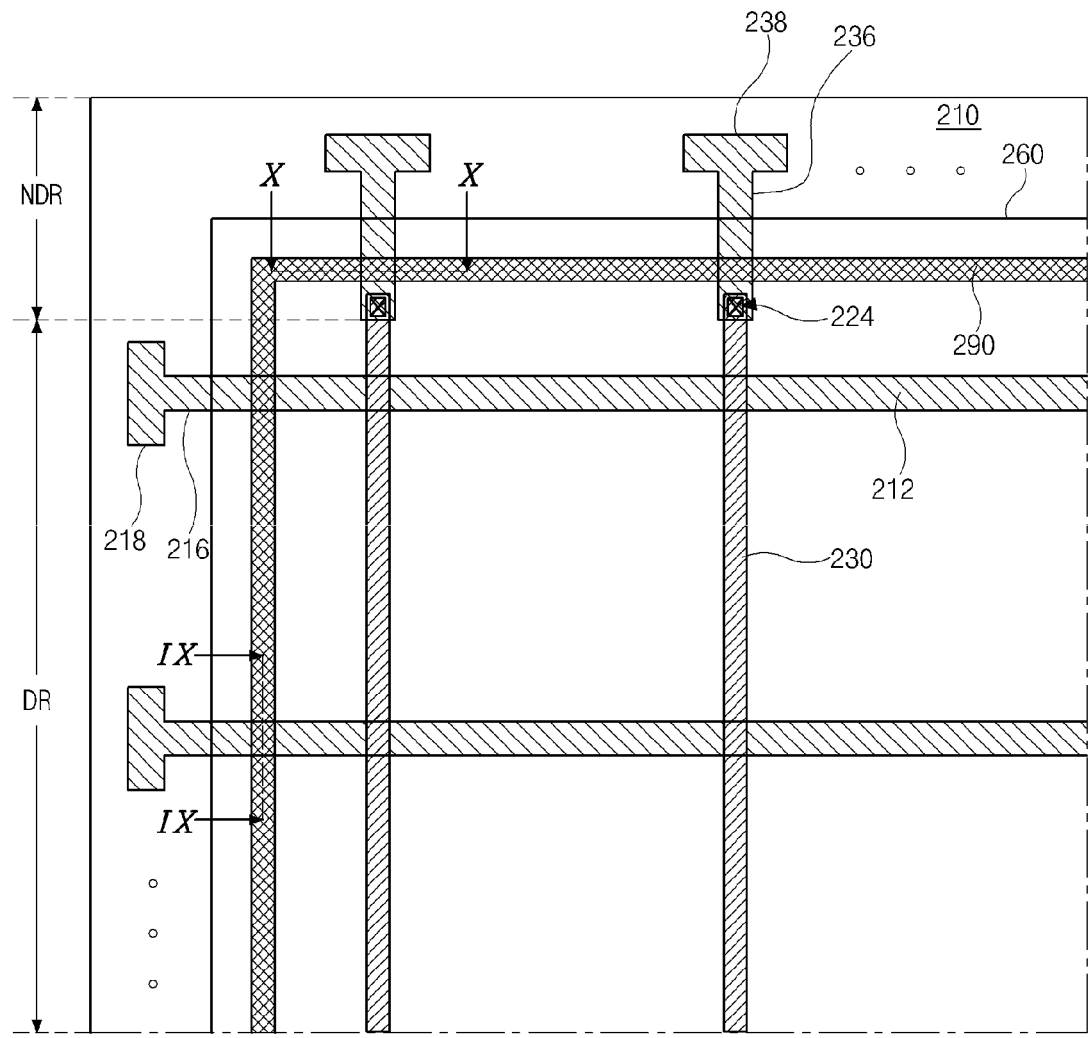
FIG. 8 is a schematic plan view of an LCD device according to a second embodiment of the present invention.
Figure 9:
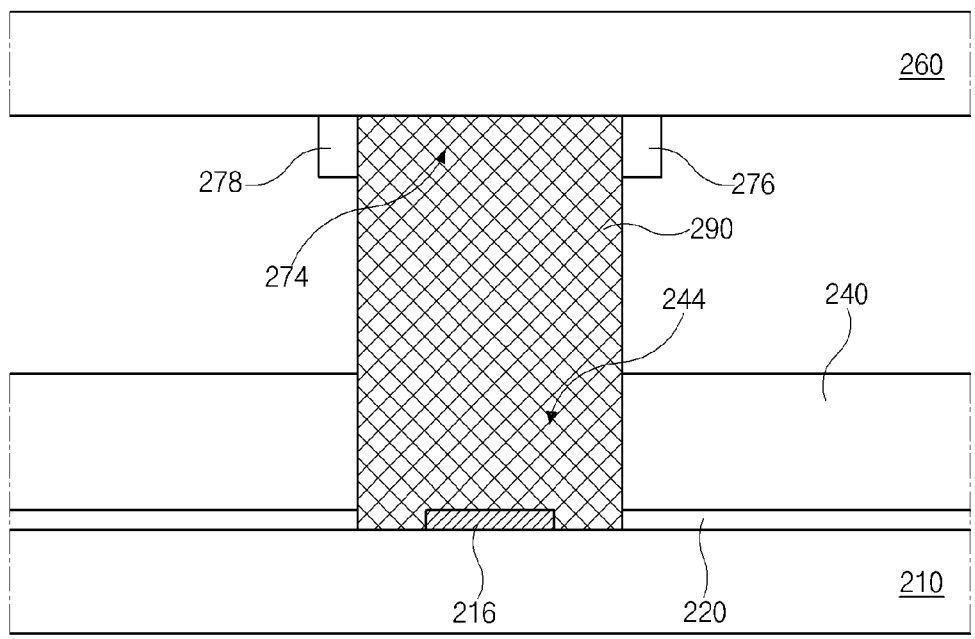
FIG. 9 is a cross-sectional view of a portion taken along line IX-IX of FIG. 8.
Figure 10:
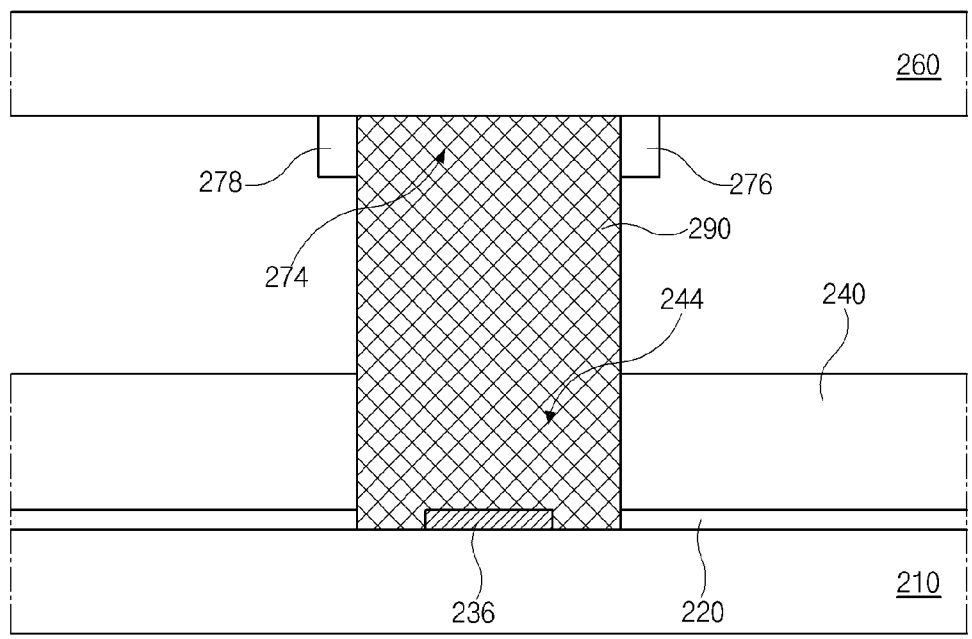
FIG. 10 is a cross-sectional view of a portion taken along line X-X of FIG. 8.
Figure 11:
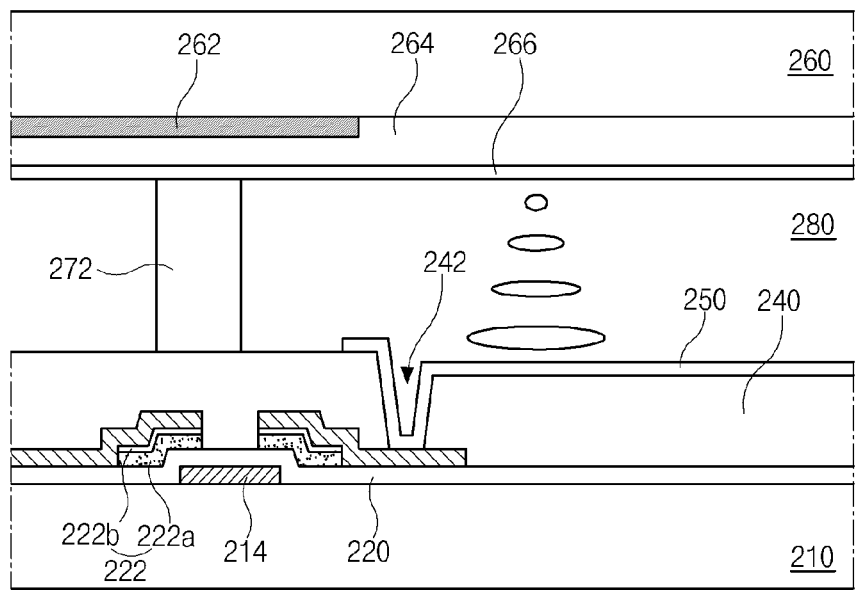
FIG. 11 is a schematic cross-sectional view of a pixel region of the LCD device according to the second embodiment of the present invention.

FIG. 8 is a schematic plan view of an LCD device according to a second embodiment of the present invention, FIG. 9 is a cross-sectional view of a portion taken along line IX-IX of FIG. 8, FIG. 10 is a cross-sectional view of a portion taken along line X-X of FIG. 8, and FIG. 11 is a schematic cross-sectional view of a pixel region of the LCD device according to the second embodiment of the present invention.

As shown in FIGS. 8 through 11, the LCD device according to the second embodiment of the present invention may include a first substrate 210, a second substrate 260, an LC layer 280, and a seal pattern 290. A TFT Tr serving as a switching device and a pixel electrode 250 may be formed on the first substrate 210. The second substrate 260 on which a common electrode 266 is formed may be disposed opposite the first substrate 210. The LC layer 280 may be interposed between the first and second substrates 210 and 260. The seal pattern 290 may bond the first and second substrates 210 and 260 to each other to prevent leakage of LCs from the LC layer 280.

A display region DR and a non-display region NDR may be defined on the first substrate 210. The display region DR may be configured to display images, and the non-display region NDR may be disposed adjacent to the display region DR. The seal pattern 290 may be formed in a seal pattern region (not shown) disposed in the non-display region NDR.

Gate lines 212 and data lines 230 may be formed on the first substrate 210 to enable switching operations of the TFT Tr, and a driver configured to apply signals to the gate lines 212 and the data lines 230 may be formed on at least one side of the first substrate 210. In this case, to connect the driver with an external driver circuit, the second substrate 260 may have a smaller size than the first substrate 210 and expose at least one side of the first substrate 210.

The gate lines 212 and the data lines 230 may intersect on the display region DR to define a plurality of pixel regions P, and the TFT Tr serving as a switching device and a pixel electrode 250 may be formed in each of the pixel regions P.

The TFT Tr may include a gate electrode 214 connected to the gate line 212, a gate insulating layer 220 covering the gate electrode 214, a semiconductor layer 222 including an active layer 222a disposed on the gate insulating layer 220 and formed of pure a-Si and an ohmic contact layer 222b formed of doped a-Si, a source electrode 232 disposed on the semiconductor layer 222 and connected to the data line 230, and a drain electrode 234 disposed on the semiconductor layer 222 and spaced apart from the source electrode 232.

A protection layer 240 having a drain contact hole 242 exposing the drain electrode 234 may be formed to cover the TFT Tr, and the pixel electrode 250 may be formed on the protection layer 240 and connected to the drain electrode 234 through the drain contact hole 242.

A gate link line 216 and a gate pad 218 may be formed on the non-display region NDR disposed on one side of the first substrate 210. The gate link line 216 may extend from the gate line 212, and the gate pad 218 may be connected to an end of the gate link line 216. Although not shown, a gate pad electrode may be formed of the same material in the same line as the pixel electrode 250 and connected to the gate pad 218.

The gate insulating layer 220 and the protection layer 240 may be stacked to cover the gate link line 218.

In addition, a data link line 236 and a data pad 238 may be formed on the non-display region NDR disposed on the other side of the first substrate 210. The data link line 236 may be connected to the data line 230, and the data pad 238 may be connected to an end of the data link line 236. The data line 230 may be connected to the data link line 236 through a data line contact hole 224. Although not shown, a data pad electrode may be formed of the same material in the same layer as the pixel electrode 250 and connected to the data pad 238.

The gate insulating layer 220 and the protection layer 240 may be stacked to cover the data link line 238.

In this case, portions of the protection layer 240 and the gate insulating layer 220 corresponding to the gate link line 216 and the data link line 236 may be completely removed to form a first seal pattern groove 244. That is, the portions of the protection layer 240 and the gate insulating layer 220 corresponding to a region in which the seal pattern 290 will be formed may be completely removed to form the first seal pattern groove 244. The gate link line 216 and the data link line 236 may be exposed through the first seal pattern groove 244.

When the first seal pattern groove 244 is formed by completely removing the protection layer 240 and the gate insulating layer 220, the thickness of the seal pattern 290 may increase. Accordingly, when a predetermined amount of sealant is coated, the width of the seal pattern 290 may be reduced due to the increase in the thickness thereof, so that a narrow bezel can be embodied.

Meanwhile, when the first seal pattern groove 244 is formed by completely removing the protection layer 240 and the gate insulating layer 220, the data link line 236 may extend from the data line 230 and be disposed in the same layer as the data line 230 so that a portion of the first seal pattern groove 244 corresponding to the gate link line 216 and a portion of the first seal pattern groove 244 corresponding to the data link line 236 can have different depths.

Specifically, only the gate link line 216 may be stacked on the first substrate 210 in the portion of the first seal pattern groove 244 corresponding to the gate link line 216, while the gate insulating layer 220 and the data link line 236 may be stacked on the first substrate 210 in the portion of the first seal pattern groove 244 corresponding to the data link line 236. Accordingly, the portion of the first seal pattern groove 244 corresponding to the gate link line 216 and the portion of the first seal pattern groove 244 corresponding to the data link line 236 may have different depths. As a result, a deviation in the thickness of the seal pattern 290 may occur so that portions of the first and second substrates 210 and 260 cannot be completely bonded to each other.

However, in the LCD device according to the present embodiment, when the first seal pattern groove 244 is formed by completely removing the protection layer 240 and the gate insulating layer 220, the data link line 236 may be formed in the same layer as the gate link line 216 so that a difference in the depth of the first seal pattern groove 244 can be prevented from occurring.

That is, in the present embodiment, the first seal pattern groove 244 may be formed by completely removing the protection layer 240 and the gate insulating layer 220 so that the width of the seal pattern 290 may be removed to embody a narrow bezel. Simultaneously, the data link line 236 may be formed in the same layer as the gate link line 216 so that the thickness of the seal pattern 290 can be uniformized.

Furthermore, a black matrix 262, a color filter 264, and a common electrode 266 may be formed on the second substrate 260 disposed opposite the first substrate 210. The black matrix 262 may be configured to cover the TFT Tr, the gate line 212, and the data line 230, the color filter layer 264 may correspond to the pixel region P, and the common electrode 266 may be configured to form an electric field along with the pixel electrode 250. The black matrix 262 and the color filter layer 264 may be omitted or formed on the first substrate 210.

In addition, a spacer 272 configured to maintain a cell gap may be formed on the display region DR, and first and second dams 276 and 278 may be formed in the non-display region NDR to correspond to both ends of the first seal pattern groove 244, thereby forming a second seal pattern groove 274 corresponding to the first seal pattern groove 244.

In this case, the first and second dams 276 and 278 may be formed of the same material in the same layer as the spacer 272. The formation of the first and second dams 276 and 278 may be performed using a semi-transmission mask process so that the spacer 272 can have a different height from the first and second dams 276 and 278.

Meanwhile, the first and second dams 276 and 278 may be formed of the same material in the same layer as the color filter layer 264. When the color filter layer 264 includes R, G, and B color filter patterns, the first and second dams 276 and 278 may include a single layer formed of any one of materials forming the R, G, and B color filter patterns, or include a double or triple layer formed by stacking at least two of materials forming the R, G, and B color filter patterns.

Furthermore, the first and second dams 276 and 278 may be continuously formed along the seal pattern 290 or a plurality of first and second dams 276 and 278 may be formed apart from one another.

The LC layer 280 may be interposed between the first and second substrates 210 and 260, that is, between the pixel electrode 250 and the common electrode 266, and LC molecules of the LC layer 280 may be driven due to an electric field formed between the pixel electrode 250 and the common electrode 266.

Meanwhile, the common electrode 266 may be formed on the first substrate 210 along with the pixel electrode 250 to form an in-plane switching-mode or FFS-mode structure.

The seal pattern 290 may be formed in the non-display region NDR to prevent leakage of LCs from the LC layer 280 and bond the first and second substrates 210 and 260 to each other. One end of the seal pattern 290 may be inserted into the first seal pattern groove 244 formed in the protection layer 240 and the gate insulating layer 220, while the other thereof may be inserted into the second seal pattern groove 274 interposed between the first and second dams 276 and 278.

Due to the above-described construction, even if a sealant is coated with a dispenser (not shown) located in an undesired second position (refer to PO2 in FIG. 3B) or third position (refer to PO3 in FIG. 3C), the seal pattern 290 may be formed in a position corresponding to the first and second sealant grooves 244 and 274 during a bonding process.

Accordingly, occurrence of a deviation in the position of the seal pattern 290 due to the position of the dispenser or the bonding process may be prevented. Also, since there is no need to consider process errors, the area of the non-display region NDR may be decreased. That is, a narrow-bezel-type LCD device may be provided.

An LCD device according to the present embodiment may further include a structure capable of determining a position of the seal pattern and prevent occurrence of errors in the position of the seal pattern, thereby embodying a narrow bezel.

Furthermore, the width of a bezel may be further reduced by preventing an increase in the thickness of the seal pattern, that is, by reducing the width of the seal pattern, and occurrence of a difference in the thickness of the seal pattern may be prevented. Accordingly, a failure in the bonding of upper and lower substrates caused by the difference in the thickness of the seal pattern may be prevented.

According to the present invention, a groove in which a seal pattern is formed can be formed by etching a protection layer formed on a lower substrate. Thus, even if an error in the position of a dispenser used for a sealant occurs, occurrence of an error in the position of the seal pattern can be prevented, thereby minimizing a region in which the seal pattern will be formed.

Therefore, a narrow bezel can be embodied.

In addition, since a groove can be formed in a protection layer by etching only a portion of the protection layer, damage to a data link line disposed under the protection layer can be prevented.

Furthermore, since a groove is formed by removing a protection layer and a gate insulating layer disposed under the protection layer, the thickness of a seal pattern can increase, and the width of the seal pattern can be reduced so that the area of a non-display region can be further reduced. Also, a data link line can be formed in the same layer as a gate line so that the thickness of the seal pattern can be uniformized.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A liquid crystal display (LCD) device comprising:
   first and second substrates facing each other, the first substrate having a display region, a non-display region, and a seal pattern region disposed therebetween;
   a protection layer on the first substrate and having a first seal pattern groove in the seal pattern region;
   first and second dams on the second substrate and respectively disposed at both ends of the seal pattern region, the first and second dams configured to form a second seal pattern groove corresponding to the first seal pattern groove;
   a pixel electrode on the first substrate;
   a common electrode on one of the first and second substrates;
   a liquid crystal layer between the first and second substrates; and
   a seal pattern having one end inserted into the first seal pattern groove and the other end inserted into the second seal pattern groove,
   wherein the protection layer has a first thickness in the display region and in the non-display region, and the protection layer has a second thickness, which is non-zero and smaller than the first thickness, across the entire width of the seal pattern between the display region and the non-display region such that the seal pattern contacts an upper surface of the protection layer in the seal pattern region, and
   wherein an entire width of a portion of the protection layer having the second thickness is equal to an entire width between the first and second dams.

2. The LCD device of claim 1, further comprising:
   a gate line and a data line configured to intersect on the first substrate and define a pixel region in the display region;
   a gate link line and a data link line configured to respectively extend from the gate line and the data line to the non-display region, entire portions of the gate link line and the date link line crossing the seal pattern region being covered by the protection layer; and
   a thin film transistor (TFT) connected to the gate line and the data line and disposed in the pixel region under the protection layer.

3. The LCD device of claim 2, wherein the gate line and the gate link line are disposed on the first substrate,
   the device further comprising a gate insulating layer covering the gate line and the gate link line,
   wherein the data line and the data link line are disposed on the gate insulating layer.

4. The LCD device of claim 2, wherein the gate line, the gate link line, and the data link line are disposed on the first substrate,
   the device further comprising a gate insulating layer covering the gate line, the gate link line, and the data link line,
   wherein the data line is disposed on the gate insulating layer and connected to the data link line through a data line contact hole formed in the gate insulating layer.

5. The LCD device of claim 4, wherein the gate link line and the data link line are exposed through the first seal pattern groove.

6. The LCD device of claim 2, wherein the TFT includes a gate electrode connected to the gate line, a gate insulating layer covering the gate electrode, a semiconductor layer including an active layer disposed on the gate insulating layer and formed of pure amorphous silicon (a-Si) and an ohmic contact layer formed of doped a-Si, a source electrode disposed on the semiconductor layer and connected to the data line, and a drain electrode disposed on the semiconductor layer and spaced apart from the source electrode.

7. The LCD device of claim 2, further comprising:
a black matrix corresponding to the gate line, the data line, and the TFT; and
a color filter layer corresponding to the pixel region.

8. The LCD device of claim 7, wherein each of the first and second dams is formed of the same material as the color filter layer and disposed in the same layer as the color filter layer.

9. The LCD device of claim 1, wherein the protection layer has a lower layer having the second thickness and an upper layer disposed on the lower layer.

10. The LCD device of claim 9, wherein the lower layer is formed of silicon oxide or silicon nitride, and the upper layer is formed of photoacryl or benzocyclobutene (BCB).

11. The LCD device of claim 1, further comprising a spacer formed on the second substrate and configured to maintain a distance between the first and second substrates,
wherein each of the first and second dams is formed of the same material as the spacer and disposed in the same layer as the spacer.

12. The LCD device of claim 1, wherein the seal pattern surrounds an entire periphery of the display region.

13. The LCD device of claim 1, wherein the seal pattern is absent from portions of the protection layer having the first thickness.

14. A liquid crystal display (LCD) device, comprising:
first and second substrates facing each other, the first substrate having a display region, a non-display region, and a seal pattern region disposed therebetween;
a gate line and a gate link line on the first substrate, the gate link line configured to extend from the gate line to the non-display region;
a gate insulating layer on the gate line and the gate link line;
a data line and a data link line on the gate insulating layer, the data link line configured to extend from the data line to the non-display region;
a protection layer on the data line and the data link line, the protection layer having a first thickness in the display region and a second thickness, which is non-zero and smaller than the first thickness, in the seal pattern region to form a first seal pattern groove in the seal pattern region;
first and second dams on the second substrate and respectively disposed at both ends of the seal pattern region, the first and second dams configured to form a second seal pattern groove corresponding to the first seal pattern groove;
a pixel electrode on the first substrate;
a common electrode on one of the first and second substrates;
a liquid crystal layer between the first and second substrates; and
a seal pattern having one end inserted into the first seal pattern groove and the other end inserted into the second seal pattern groove, the seal pattern overlapping the data link line,
wherein the data link line under the seal pattern is covered by a portion of the protection layer having the second thickness.

* * * * *